US010536231B2

(12) United States Patent
Okabayashi

(10) Patent No.: US 10,536,231 B2
(45) Date of Patent: Jan. 14, 2020

(54) MIXER, CONTROL METHOD OF MIXER, AND PROGRAM

(71) Applicant: Yamaha Corporation, Hamamatsu-shi, Shizuoka-Ken (JP)

(72) Inventor: Masaaki Okabayashi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 16/366,196

(22) Filed: Mar. 27, 2019

(65) Prior Publication Data

US 2019/0222332 A1 Jul. 18, 2019

Related U.S. Application Data

(63) Continuation of application No. PCT/JP2017/032609, filed on Sep. 11, 2017.

(30) Foreign Application Priority Data

Sep. 28, 2016 (JP) .................................. 2016-189989

(51) Int. Cl.
*H04H 60/04* (2008.01)
*G06F 3/16* (2006.01)
*G10H 1/46* (2006.01)

(52) U.S. Cl.
CPC ............. *H04H 60/04* (2013.01); *G06F 3/165* (2013.01); *G10H 1/46* (2013.01); *H04R 2430/01* (2013.01); *H04S 2400/13* (2013.01)

(58) Field of Classification Search
CPC .......... H04H 60/04; G06F 3/165; H04R 3/00; H04R 2430/01; H04S 2400/13; G10H 1/46
See application file for complete search history.

(56) References Cited

U.S. PATENT DOCUMENTS 8,379,883 B2 * 2/2013 Terada ...................... G10H 1/46
381/109
2011/0033061 A1 * 2/2011 Sakurada ............. G10H 1/0058
381/81

FOREIGN PATENT DOCUMENTS

JP 2004-247898 A 9/2004

OTHER PUBLICATIONS

International Search Report (PCT/ISA/210) issued in PCT Application No. PCT/JP2017/032609 dated Dec. 5, 2017 with English translation (three pages).

(Continued)

*Primary Examiner* — Andrew L Sniezek
(74) *Attorney, Agent, or Firm* — Crowell & Moring LLP

(57) ABSTRACT

A mixer includes a storage portion, a reception portion, a user-definition-scene-memory setting portion, a setting changing portion, a storage processing portion, and a recall processing portion. The reception portion receives specification of several parameters among a plurality of parameters. The storage portion stores setting values of the plurality of parameters. The user-definition-scene-memory setting portion stores the several parameters, received by the reception portion, in the storage portion for every scene as a user-definition-scene-memory. The setting changing portion receives an operation of changing current setting of the plurality of parameters. The storage processing portion stores setting values of the several parameters, changed in the setting changing portion, in the current data storage portion. The recall processing portion calls setting values of the several parameters corresponding to the user-definition-scene-memory from the storage portion, when a recall of the user-definition-scene memory is received in the reception portion.

11 Claims, 14 Drawing Sheets

(56) References Cited

OTHER PUBLICATIONS

Japanese-language Written Opinion (PCT/ISA/237) issued in PCT Application No. PCT/JP2017/032609 dated Dec. 5, 2017 (three pages).

* cited by examiner

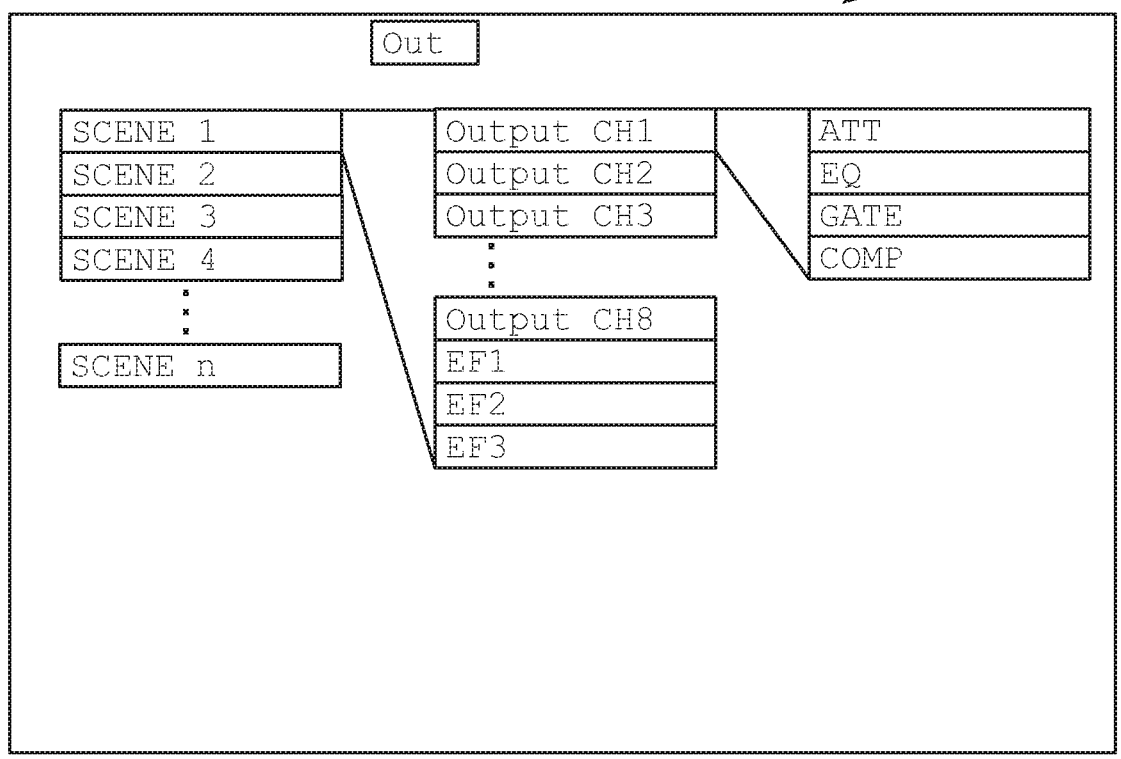

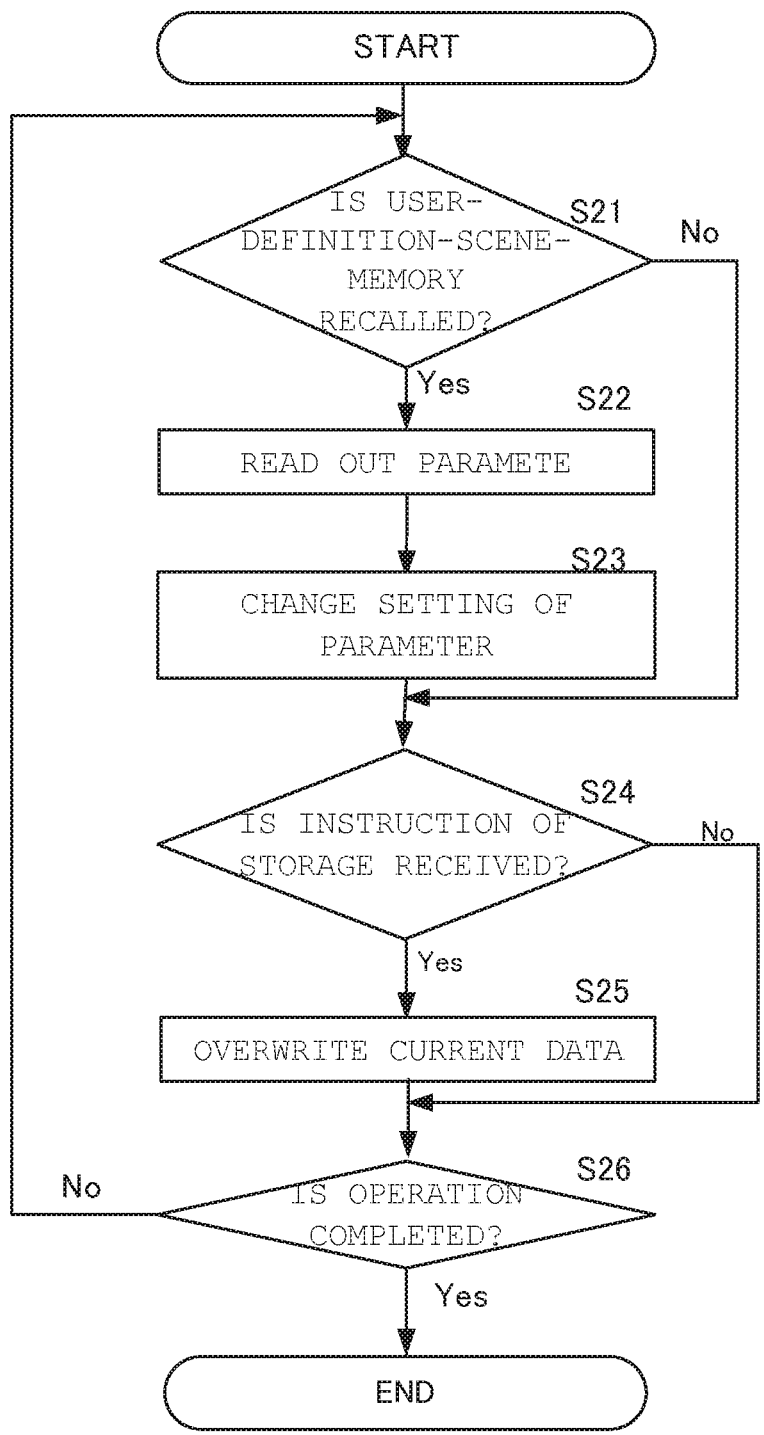

MIXER, CONTROL METHOD OF MIXER, AND PROGRAM

CROSS REFERENCE TO RELATED APPLICATIONS

The present application is a continuation application of International Patent Application No. PCT/JP2017/032609, filed on Sep. 11, 2017, which claims priority to Japanese Patent Application No. 2016-189989, filed on Sep. 28, 2016. The contents of these applications are incorporated herein by reference in their entirety.

BACKGROUND OF THE INVENTION

1. Field of the Invention

The invention relates to a mixer, a control method of the mixer, and a program.

2. Description of the Related Art

In an audio mixer, a user operates various kinds of operation elements on an operation panel to determine various kinds of parameter values, such as volume. The audio mixer includes a scene memory that stores the various kinds of parameter values. Only by instructing to recall the scene memory, a user can recall the values, which have been set in the past, immediately. This makes it possible for a user to call optimal values immediately for every scene, in the case where scenes are set during a rehearsal of a concert, for example. Such reproduction operation is called "a scene recall."

Among the operation elements, however, there is an operation element whose manipulated variable or the like is determined necessarily according to any current situation. Accordingly, as described in Unexamined Japanese Patent Publication No. 2004-247898 (hereinafter referred to as Patent Literature 1), an audio mixer may be equipped with a recall safe function in which several parameters are removed from a scene recall target, for example.

The mixing system in Patent Literature 1 displays current data, which indicates current setting states, on a display. When a user instructs to store the current data as one scene, the current data is stored in a scene memory. At this time, however, if "the scene recall" is executed, only data of parameters that are not specified as recall safe will be recalled.

SUMMARY OF THE INVENTION

According to any current situation, a user may change a recall range. For instance, a user may be desired to perform a recall only on an output side, but on an input side, desired to perform in-situ adjustment.

In the conventional scene memory, however, all of parameter setting values are stored as current data. Besides, the recall safe function merely fails to call only target parameter setting values specified as the recall safe, but is not allowed to perform such processing as only an input-side recall or only an output-side recall.

Therefore, one exemplary embodiment of the invention aims to provide a mixer capable of setting a recall range more flexibly than before, a control method of the mixer, and a program.

A mixer includes a storage portion, a reception portion, a user-definition-scene-memory setting portion, a setting changing portion, a storage processing portion, and a recall processing portion. The reception portion receives specification of several parameters among a plurality of parameters. The storage portion stores setting values of the plurality of parameters. The user-definition-scene-memory setting portion stores the several parameters, which have been received by the reception portion, in the storage portion for every scene as a user-definition-scene-memory. The setting changing portion receives an operation of changing the current setting of the plurality of parameters. The storage processing portion stores setting values of the several parameters, which have been changed in the setting changing portion, in the current-data storage portion. When the reception portion receives a recall of a user-definition-scene-memory, the recall processing portion calls the setting values of the several parameters corresponding to the user-definition-scene-memory from the storage portion.

According to one exemplary embodiment of the present invention, a recall range can be set more flexibly than before.

BRIEF DESCRIPTION OF DRAWINGS

FIG. 13 is a view showing a user-definition-scene-memory for Out (Output); and

FIG. 14 is a flowchart showing operation of the CPU 18.

DETAILED DESCRIPTION OF THE INVENTION

Figure 1:
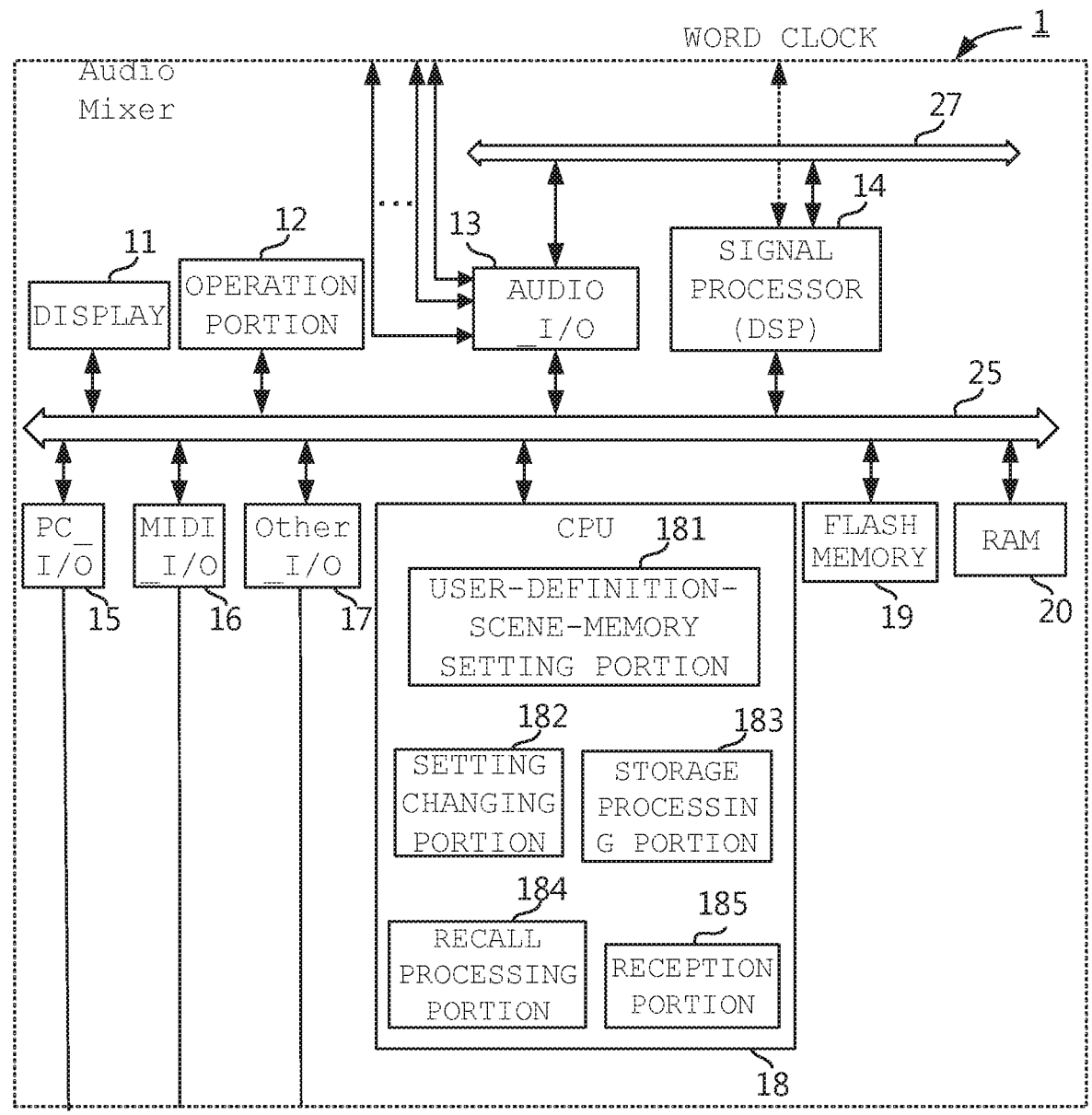
FIG. 1 is a block diagram showing a configuration of an audio mixer.

FIG. 1 is a block diagram showing a configuration of an audio mixer (mixer) 1. The audio mixer 1 includes a display 11, an operation portion 12, and an audio_I/O (Input/Output) 13, a signal processor 14, a PC_I/O 15, a MIDI_I/O 16, other_I/O 17, a CPU 18, a flash memory 19, and a RAM 20.

The display 11, the operation portion 12, the audio_I/O 13, the signal processor 14, the PC_I/O 15, the MIDI_I/O 16, the other_I/O 17, the CPU 18, the flash memory 19, and the RAM 20 are connected with one another through a bus 25. Further, the audio_I/O 13 and the signal processor 14 are also connected to a waveform bus 27 in order to transmit digital audio signals.

The audio_I/O 13 is an interface for receiving an audio signal input to be processed in the signal processor 14. In the audio_I/O 13, an analog input port, a digital input port, or the like is provided to receive the audio signal input. Further, the audio_I/O 13 is an interface for outputting audio signals processed in the signal processor 14. In the audio_I/O 13, an analog output port, a digital output port, or the like is provided to output the audio signals.

The PC_I/O 15, the MIDI_I/O 16, and the other_I/O 17 each are interfaces that are connected to various kinds of external apparatuses to perform output to or input from these components. For instance, an external PC is connected to the PC_I/O 15. Further, an apparatus suitable for MIDI (Musical Instrument Digital Interface), such as a physical controller or electronic instrument, is connected to the MIDI_I/O 16. A display is connected to the other_I/O 17, for example. Alternatively, UI (User Interface) devices, such as a mouse and a keyboard, are connected to the other_I/O 17. Any standards, such as Ethernet (registered trademark) and USB (Universal Serial Bus), can be used for communication with the external apparatuses. Further, wire-based or wireless-based connection may be employed.

The CPU 18 (computer) is a controller that controls operation of the audio mixer 1. The CPU 18 reads out a predetermined program stored in the flash memory 19, serving the RAM 20 as a storage portion to perform various kinds of operations. The CPU 18 executes the program to function as a user-definition-scene-memory setting portion 181, a setting changing portion 182, a storage processing portion 183, and a recall processing portion 184. Further, the CPU 18 also executes the program to function as a reception portion 185 that receives specification of several parameters among a plurality of parameters.

The CPU 18 controls the display 11 to display various kinds of information. The display 11 is constituted by, for example, an LCD or a light emitting diode (LED).

The operation portion 12 corresponds to a reception portion that receives an operation related to the audio mixer from a user. The operation portion 12 is constituted by various kinds of keys, buttons, rotary encoders, sliders, and the like. Further, the operation portion 12 may be constituted by a touch panel laminated on the LCD serving as the display 11.

The signal processor 14 is constituted by a plurality of DSPs (Digital Signal Processors) for performing various kinds of signal processing, such as mixing processing and effect processing. In the signal processor 14, the audio signal supplied from the audio_I/O 13 through the waveform bus 27 is subjected to effect processing, such as mixing processing or equalizing. The signal processor 14 outputs the digital audio signal, which has been subjected to the signal processing, to the audio_I/O 13 again through the waveform bus 27.

Figure 2:
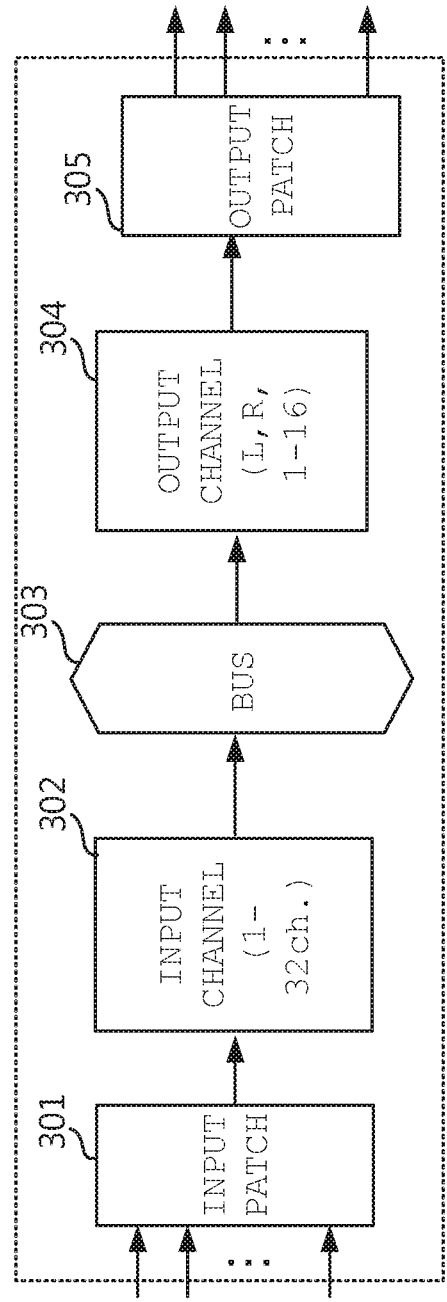
FIG. 2 is an equivalent block diagram of signal processing performed in a signal processing portion 14, an audio_I/O13 and a CPU 18.

FIG. 2 is a functional block diagram of signal processing that is performed in the signal processor 14, the audio_I/O 13, and the CPU 18. As shown in FIG. 2, the signal processing is performed functionally through an input patch 301, an input channel 302, a bus 303, an output channel 304, and an output patch 305.

The input patch 301 receives an audio signal from a plurality of input ports (e.g., an analog input port or a digital input port) in the audio_I/O 13. In the input patch 301, any one of the plurality of ports is assigned to at least one of a plurality of channels (e.g., 32ch). Thus, the audio signal is supplied to each channel in the input channel 302.

Figure 3:
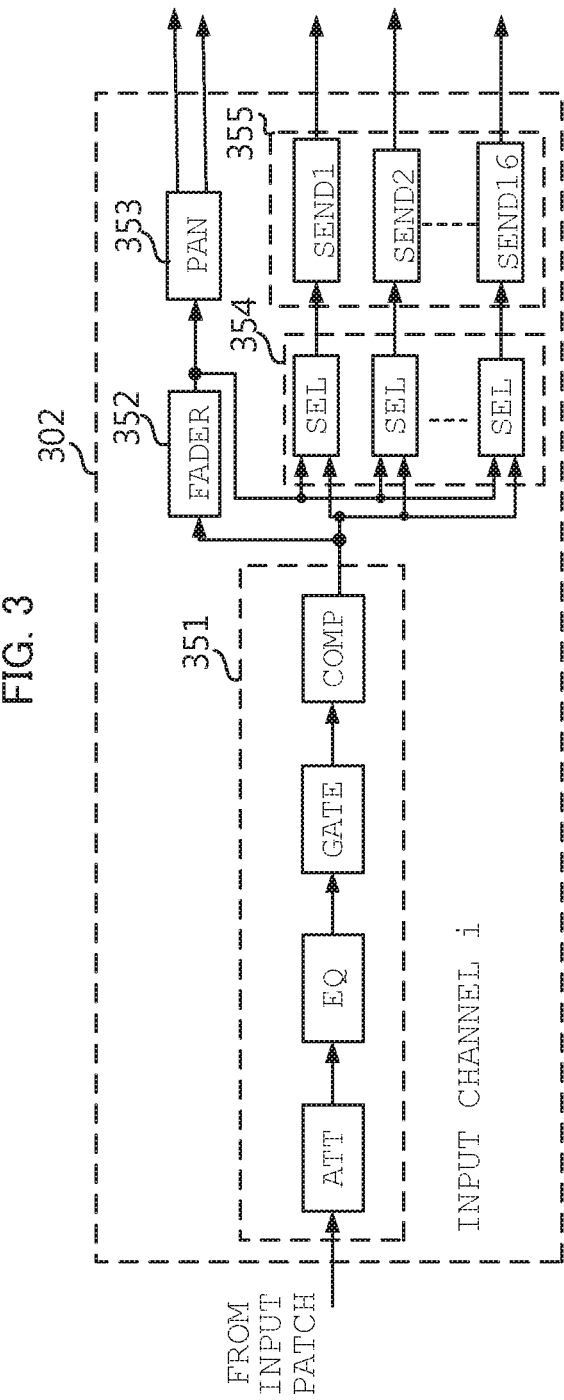
FIG. 3 is a view showing a processing configuration of a certain input channel i.

FIG. 3 is a view showing a processing configuration of a certain input channel i. At each channel in the input channel 302, the audio signal supplied from the input patch 301 is subjected to signal processing such as attenuator (ATT), equalizer (EQ), gate (GATE), or compressor (COMP) through a signal-processing block 351.

The audio signal subjected to the signal processing is level-adjusted in a fader (FADER) 352, and then sent out to the bus 303, which is located in the latter stage, through a pan portion (PAN) 353. The pan portion 353 adjusts a balance of a signal to be supplied to a stereo bus (two-channel bus serving as a master output) of the bus 303.

Note that, a selector 354 can cause a send portion 355, which is located in the latter stage, to receive either of the signal outputted from the signal-processing block 351 or the signal level-adjusted in the fader 352, in response to user's selection operation.

Further, the audio signal subjected to the signal processing is level-adjusted in the send portion (SEND) 355 through the selector (SEL) 354, and then sent out to the bus 303 located in the latter stage. The send portion 355 is switched by a user to determine whether or not to supply a signal to each SEND bus in the bus 303. Further, according to each SEND level set by a user, a level of the signal to be supplied to each SEND bus is adjusted in the send portion 355.

Output channel 304 has sixteen channels, for example. At each channel in the output channel 304, the inputted audio signal is subjected to various kinds of signal processing, like in the input channel. At each channel in the output channel 304, the audio signal subjected to the signal processing is sent to the output patch 305. The output patch 305 assigns each channel in the output channel 304 to any one of a plurality of ports serving as an analog output port or a digital output port. Thus, the audio signal that has been subjected to the signal processing is supplied to the audio_I/O 13.

The signal processing, described above, is controlled based on setting values of various kinds of parameters. The CPU 18 (user-definition-scene-memory setting portion 181) stores the current setting values (current data) of various kinds of parameters in the flash memory 19 or the RAM 20, which serves as a storage portion. The CPU 18 (setting changing portion 182) receives the current data, when a user operates the operation portion 12. The CPU 18 (storage processing portion 183) updates the current data (stored in the storage portion). Note that, the current data may be stored in both of the flash memory 19 and the RAM 20.

Figure 4:
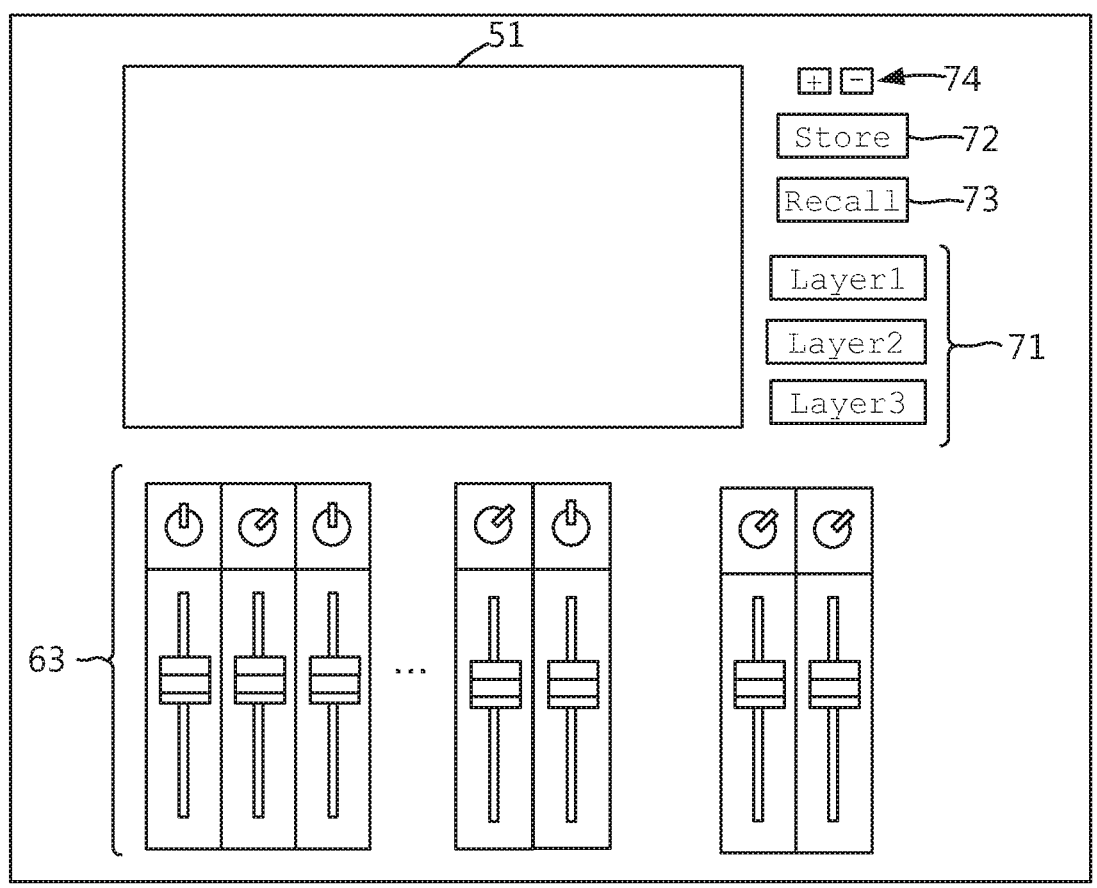
FIG. 4 is a view showing a configuration of an operation panel of the audio mixer 1.

Secondly, FIG. 4 is a view showing a configuration of an operation panel in the audio mixer 1. On the operation panel of the audio mixer 1, as shown in FIG. 4, a touch screen 51, a channel strip 63, layer selection switches 71, a store button 72, a recall button 73, an increase and decrease button 74, and the like are provided. These components correspond to the display 11 and the operation portion 12 shown in FIG. 1.

The touch screen 51 is the display 11 on which the touch panel, which is described as one embodiment of the operation portion 12, is mounted, and displays a GUI (graphical user interface) screen for receiving a user's operation.

The channel strip 63 is an area in which a plurality of operation elements are arranged vertically. Herein, each of the plurality of operation elements receives operation for each channel. In the figure, only one fader and one knob are illustrated for each channel as an operation element. In practice, however, a plurality of knobs, switches, or the like may be provided. In the channel strip 63, a plurality of faders and knobs (e.g., sixteen faders and knobs) disposed on the left-hand side correspond to input channels. In the channel strip 63, two faders and two knobs disposed on the right-hand side are operation elements corresponding to a master output (two-channel bus).

Note that, the layer selection switches 71 can be operated to switch a channel corresponding to each of the plurality of faders and knobs. For instance, when a "Layer1" switch is operated, sixteen faders and knobs disposed on the left-hand side are assigned to input channels 1 to 16. Further, when a "Layer2" switch is operated, sixteen faders and knobs located on the left-hand side are assigned to input channels 17 to 32.

The store button 72 is a button for instructing to store a scene. By operating the store button 72, a user can cause the flash memory 19 to store current data as a piece of scene data (storage). The flash memory 19 can store a plurality of scene data. By operating the increase and decrease button 74, a user can select a scene to be recalled from a plurality of scenes. Herein, the target scene is a scene whose scene data is to be stored and called. When operating the recall button 73, a user can call scene data to be required, thereby making it possible to call setting values of various kinds of parameters (recalling).

Furthermore, when a user selects any parameter, the audio mixer 1 in accordance with the present exemplary embodiment can set a user-definition-scene-memory of which a storage area and a recall area are restricted.

Figure 5A:
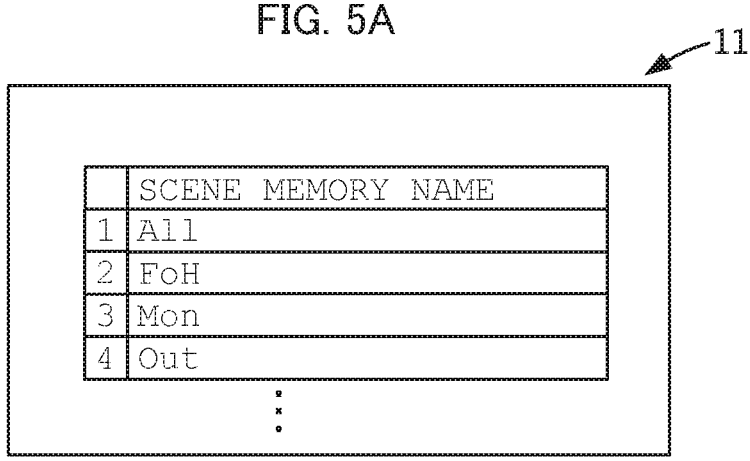
FIG. 5A is a view exemplarily showing a list screen of a user-definition-scene-memory.
Figure 5B:
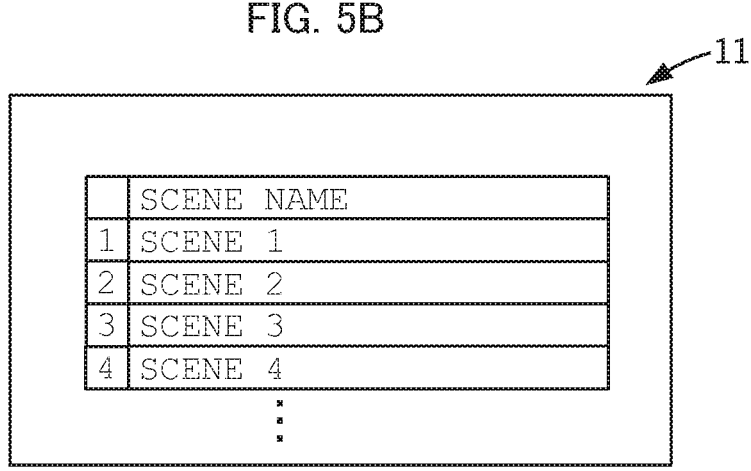
FIG. 5B is a view exemplarily showing another list screen of the user-definition-scene-memory.
Figure 6:
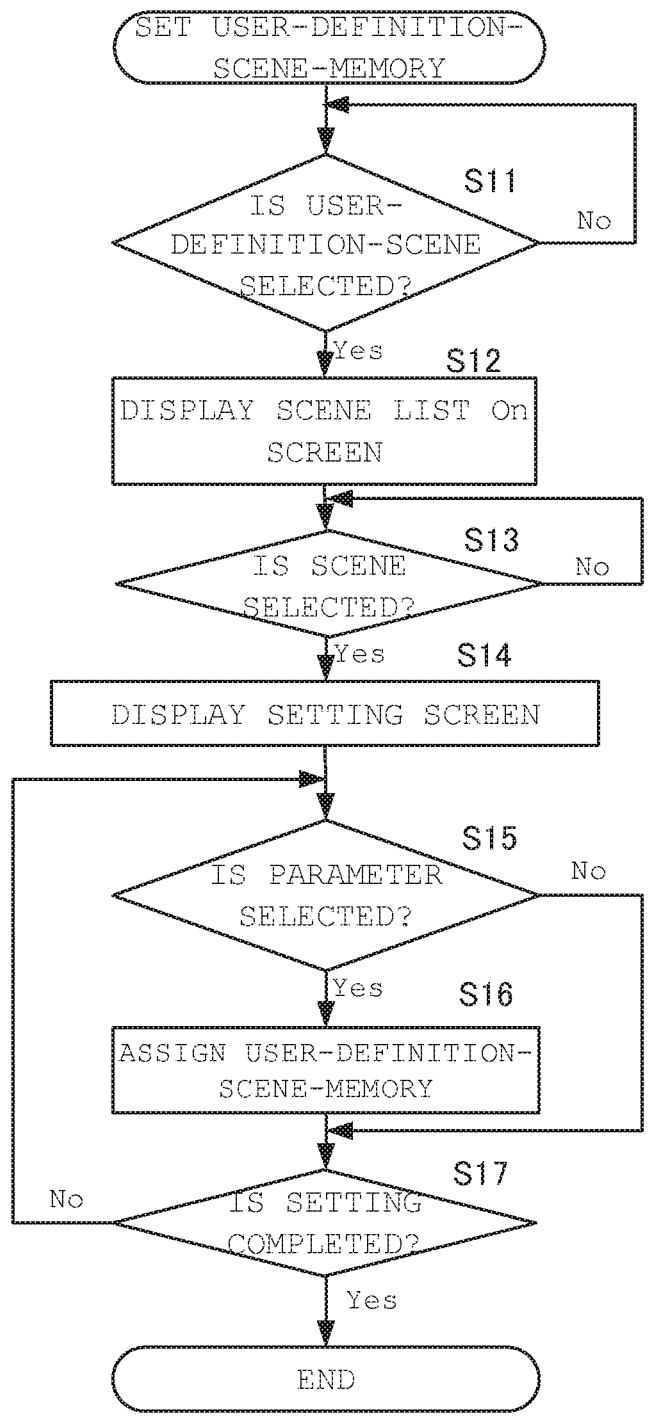
FIG. 6 is a flowchart showing operation of a CPU 18.

FIG. 5A is a view exemplarily showing a list screen of the user-definition-scene-memory. FIG. 5B is a view exemplarily showing another list screen of the user-definition-scene-memory. FIG. 6 is a flowchart showing operation of the CPU 18 (user-definition-scene-memory setting portion 181). When a user recalls a scene memory, the CPU 18 displays a scene memory list screen as shown in FIG. 5A on the display 11.

The scene memory in accordance with the present exemplary embodiment has the entire scene memory (All) that manages all parameters, and a user-definition-scene-memory that restricts an area managing parameters. As shown in the example of FIG. 5A, three names, i.e., FoH (Front of Hall), Mon (Monitor), and Out (Output) are stored in the user-definition-scene-memory. Each name of the user-definition-scene-memory, other than "All," can be determined freely by a user. FoH is a name used for managing a sound outputted to the front of hall. Mon is a name used for managing a monitor sound outputted to a player. Out is a name used for managing output-side effects.

Herein, a control method of the audio mixer 1 using the user-definition-scene-memory will be described. The audio mixer 1 performs reception processing, user-definition-scene-memory setting processing, setting changing processing, and storage processing. The reception processing receives several parameters that are selected by a user, in order to assign the several parameters. The user-definition-scene-memory setting processing stores the received several parameters in a storage portion for every scene as a user-definition-scene-memory. The setting changing processing receives an operation of changing the current setting of a plurality of parameters, and then stores setting values of the several parameters, which have been changed, in the storage portion. When a recall of a user-definition-scene-memory is received, the storage processing calls setting values of the parameter corresponding to the above-mentioned user-definition-scene-memory from the storage portion. When the reception portion 185 receives the recall of the user-definition-scene-memory, the recall processing calls setting values of the several parameters corresponding to the above-mentioned user-definition-scene-memory from the storage portion.

Figure 7:
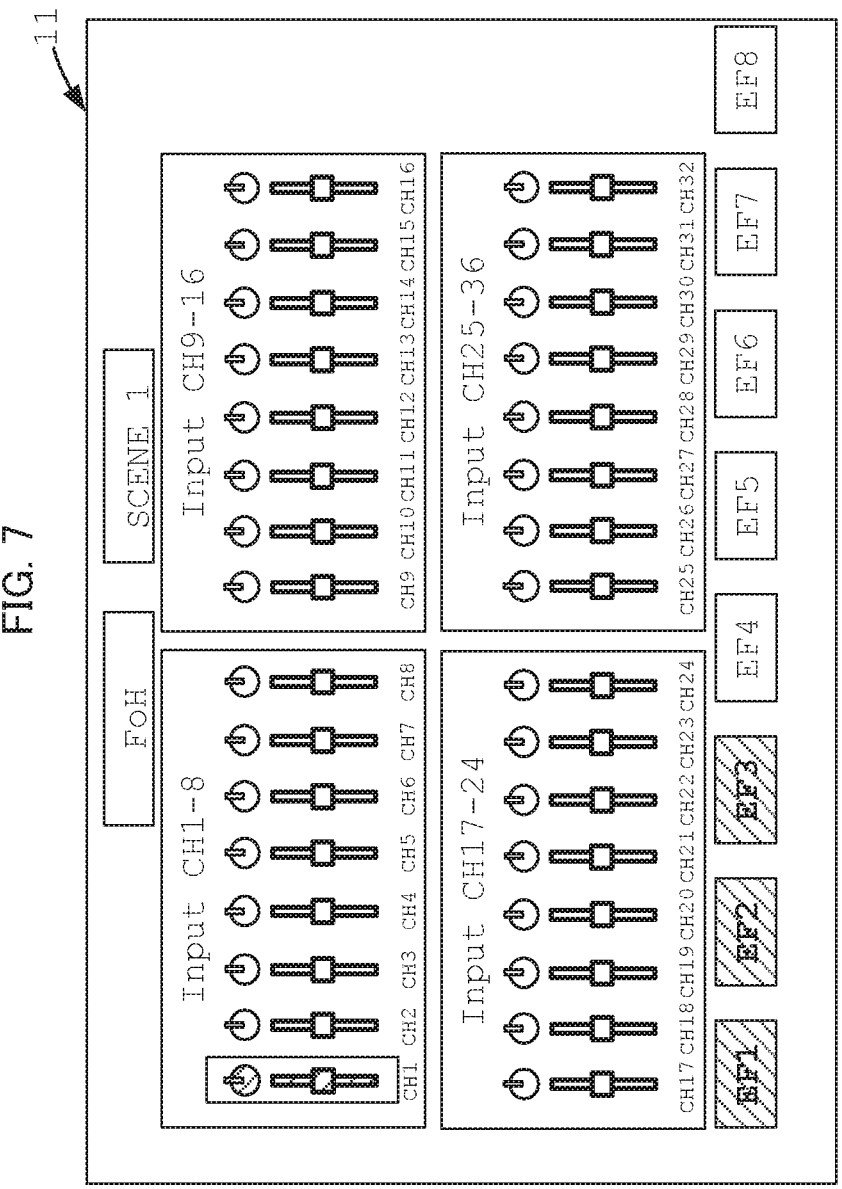
FIG. 7 is a view showing a setting screen for assigning a parameter to the user-definition-scene-memory.

First, the user-definition-scene-memory setting processing will be described in more detail with reference to FIGS. 5A, 5B, 6, and 7. In a list screen of scene memory shown in FIG. 5A, if a user operates to select FoH as a user-definition-scene-memory (S11), for example, the CPU 18 will display a scene list screen shown in FIG. 5B (S12). If a user selects a predetermined scene from the scene list screen (S13:Yes), the CPU 18 will display a setting screen as shown in FIG. 7 (S14). FIG. 7 is a view exemplarily showing a setting screen for assigning a parameter to the user-definition-scene-memory. In the setting screen, a user can select an input channel, an output channel, effects (EF1, EF2, EF3 . . . EF8), or the like. Images imitating channel strips are displayed on the display 11. By selecting these images imitating channel strips, a user can select the input channel. FIG. 7 exemplarily shows a setting screen of a user-definition-scene-memory for FoH. In other words, thirty-two input channels are displayed in an upper part of the display 11, and selection images of effects (EF1, EF2, EF3 . . . EF8) are displayed in the lowest part of the display 11.

If a user selects any parameter in the setting screen (S15:Yes), the CPU 18 will assign the selected parameter to the user-definition-scene-memory that is under setting (S16). Thus, the predetermined parameter is assigned to the user-definition-scene-memory and stored in the storage portion. Finally, the CPU 18 checks whether or not the user instructs to complete the setting (S17). If the user instructs to complete the setting (S17:Yes), the operation will be ended.

In the example of FIG. 7, a user selects an input channel 1. Accordingly, the input channel 1 is assigned to the user-definition-scene-memory for FoH as a scene 1, and stored in the storage portion.

Figure 8:
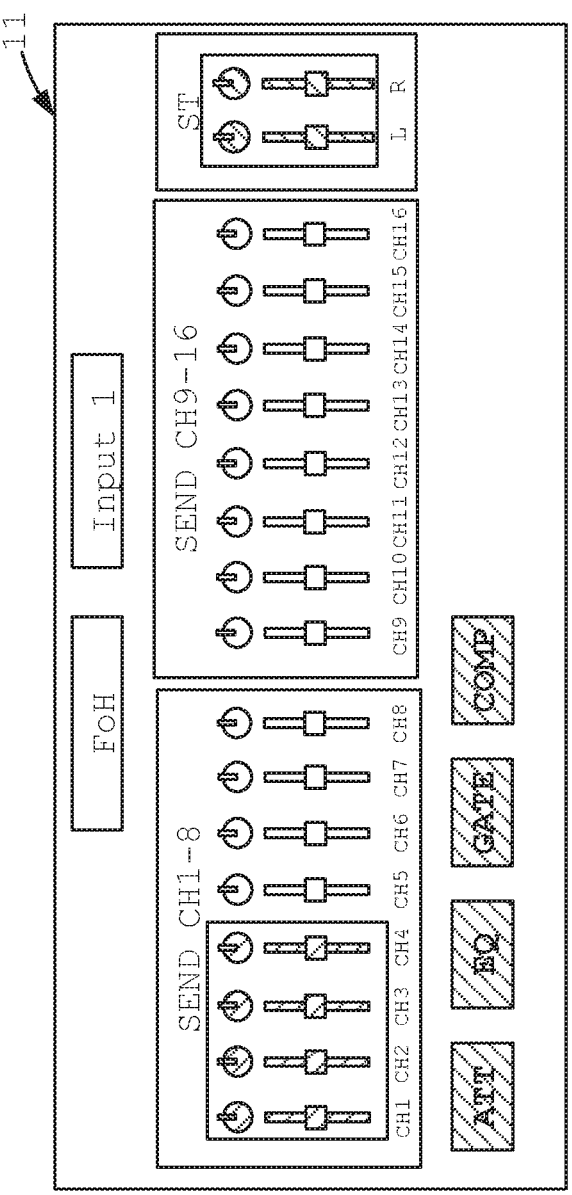
FIG. 8 is a view showing a sub-window with respect to an input channel 1.

Furthermore, when a user selects the input channel 1, the CPU 18 displays a sub-setting screen shown in FIG. 8, with respect to the input channel 1. In the sub-setting screen shown in FIG. 8, a user can select an output destination (SEND bus or stereo bus) with respect to the input channel 1 and an effect performed in the input channel 1. If the user selects the output destination and the effect in the sub-setting screen, the output destination with respect to the input channel 1 and parameters of the effect will be assigned to the user-definition-scene-memory for FoH. In the example of FIG. 8, the user selects buses of SEND CHs 1 to 4 and a stereo bus as the output destination, and selects effects of ATT, EQ, GATE, and COMP.

Figure 9:
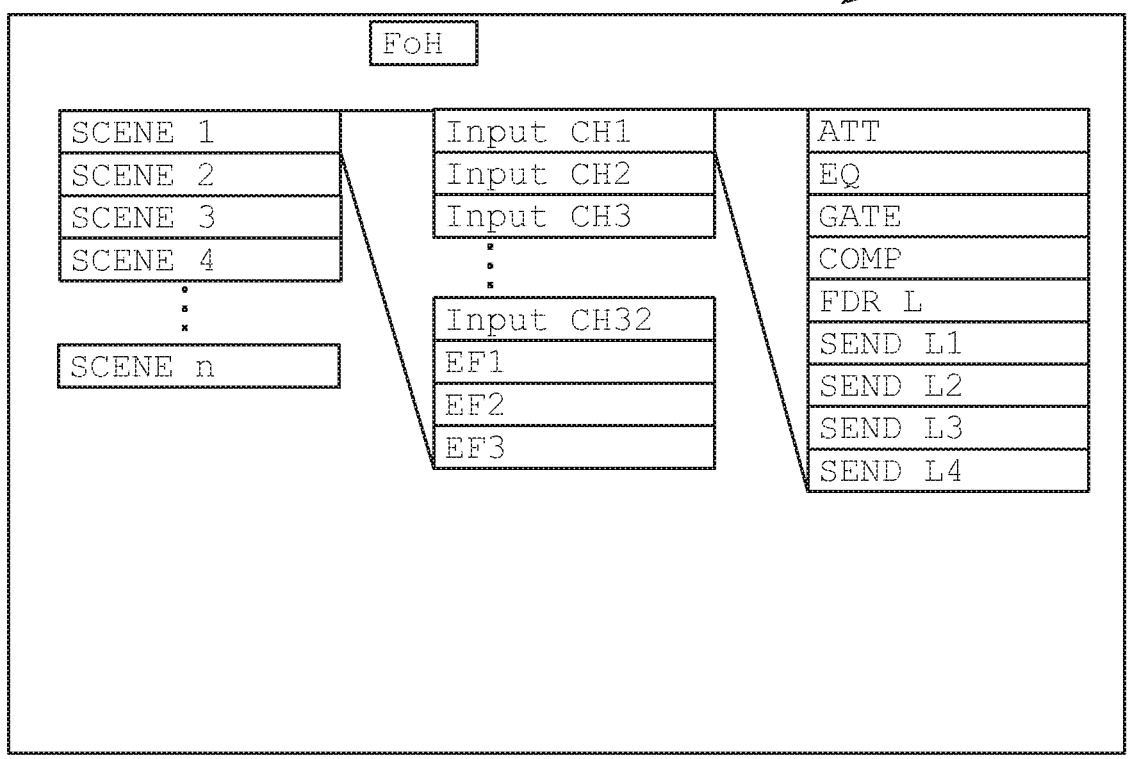
FIG. 9 is a view showing a user-definition-scene-memory for FoH (Front of House)

Thus, as shown in FIG. 9, as the input channel 1 in the scene 1, memory areas that store information (parameter setting value) indicating setting values of effects of ATT, EQ, GATE, and COMP are assigned to the user-definition-scene-memory for FoH. Further, as the input channel 1 in the scene 1, memory areas that store a fader level (FDR L) of a front stereo bus and parameter setting values of SEND levels (SEND L) 1 to 4 are assigned to the user-definition-scene-memory for FoH. As a result, as shown in FIG. 9, in response to user's store instruction, the parameter setting values of effects of ATT, EQ, GATE, and COMP, the fader level (FDR L) of the front stereo bus, and the parameter setting values of SEND levels (SEND L) 1 to 4 are stored in the memory (flash memory 19 or RAM20), for example. Further, in response to user's recall instruction, the parameter setting values of effects of ATT, EQ, GATE, and COMP, the fader level (FDR L) of the front stereo bus, and the parameter setting values of SEND levels (SEND L) 1 to 4 are called, and the current data is overwritten thereon.

Figure 10A:
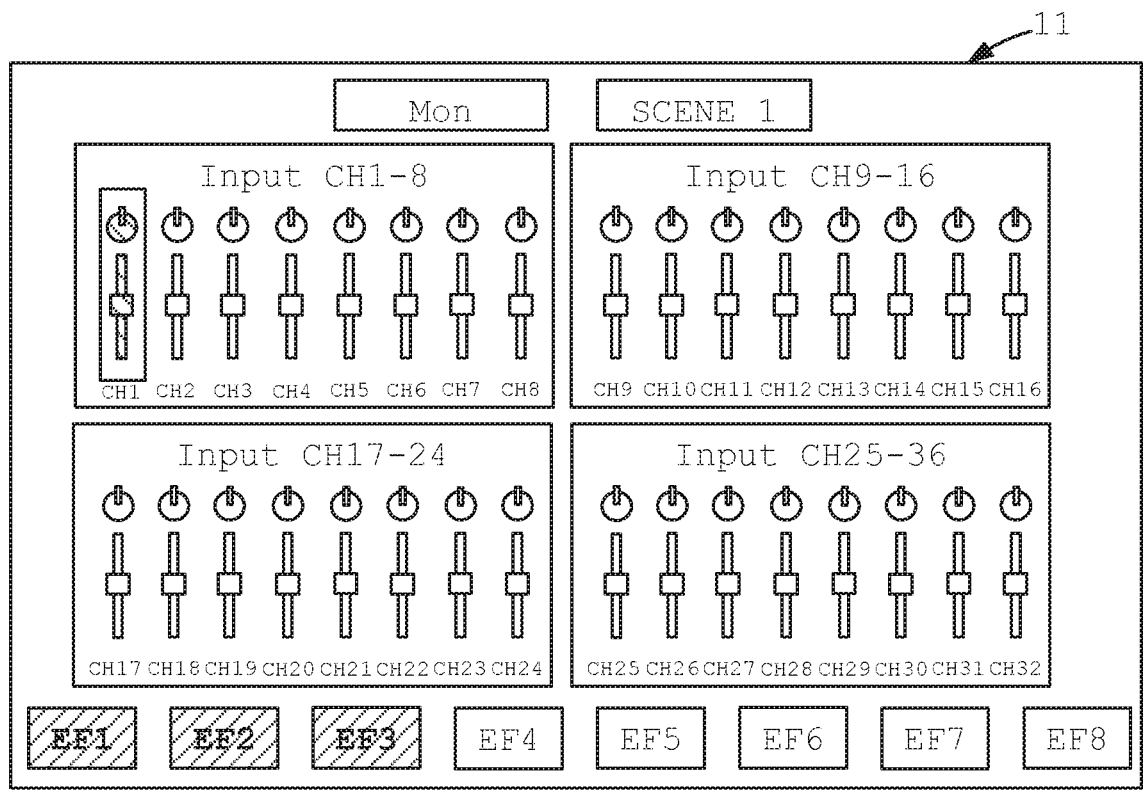
FIG. 10A is a view showing a setting screen for Mon.
Figure 10B:
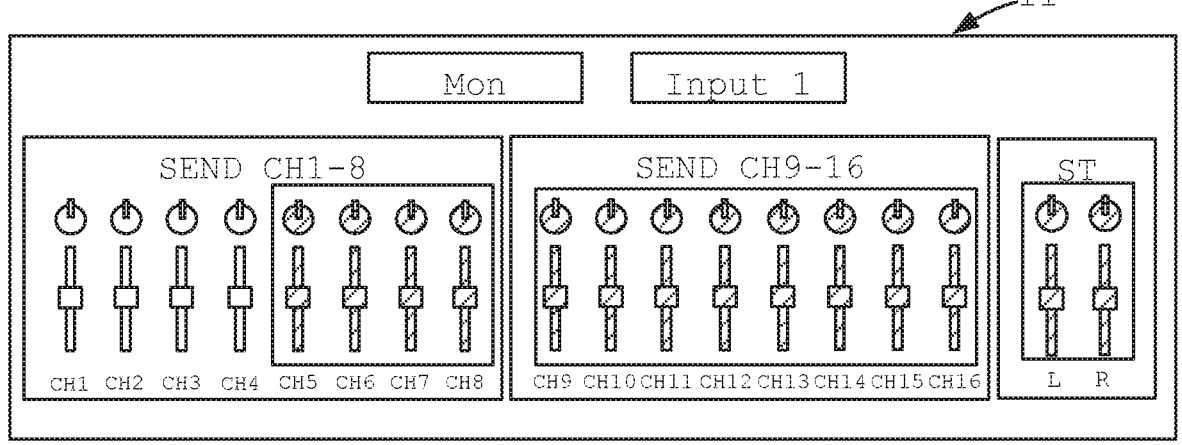
FIG. 10B is a view showing a sub-window with respect to an input channel 1.
Figure 11:
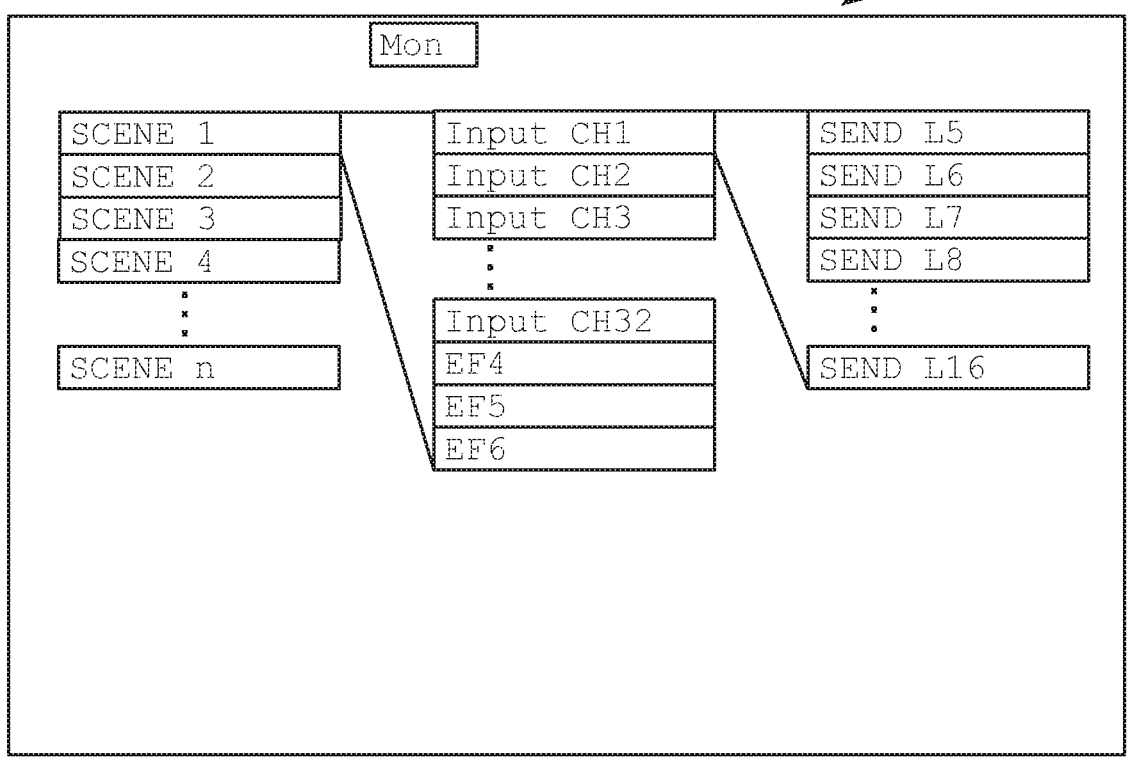
FIG. 11 is a view showing a user-definition-scene-memory for Mon (Monitor)

The example of FIG. 9 shows the user-definition-scene-memory for FoH, but not limited to this. In addition to this, a user can also set a user-definition-scene-memory for Mon, for example. FIG. 10A is a view showing a setting screen for assigning a parameter to the user-definition-scene-memory for Mon. In the setting screen for Mon, thirty-two input channels are displayed in an upper part of the display 11, and selection images of effects (EF1, EF2, EF3, EF8) are displayed in the lowest part of the display 11. If a user selects an input channel 1, the CPU 18 will display a sub-setting screen related to the input channel 1, as shown in FIG. 10B. In the sub-setting screen shown in FIG. 10B, the user can select SEND buses (CHs 1 to 16) or a stereo bus as an output destination with respect to the input channel 1. In the setting screen for Mon, selection images for selecting effects are not displayed (unassignable). In the example of FIG. 10B, a user selects SEND CHs 5 to 16 with respect to the input channel 1. Thus, as shown in FIG. 11, as the input channel 1 in the scene 1, memory areas that store parameter setting values of SEND levels (SEND L) 5 to 16 are assigned to the user-definition-scene-memory for Mon. However, memory areas that store parameter setting values of various kinds of effects are not assigned to the user-definition-scene-memory for Mon.

Figure 12:
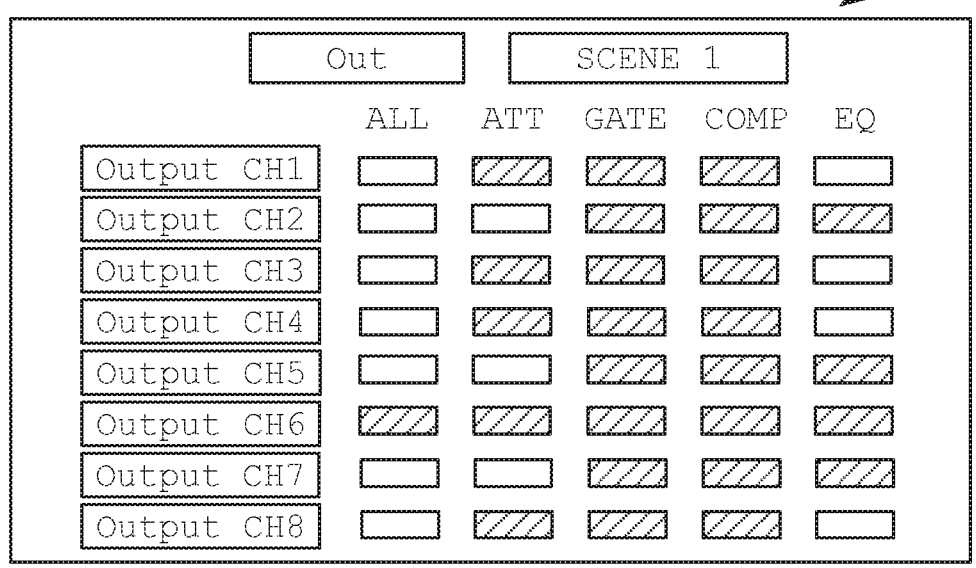
FIG. 12 is a view showing a setting screen for Out.

Further, in addition to this, a user can also set a user-definition-scene-memory for Out, for example. FIG. 12 is a view showing a setting screen for assigning a parameter to the user-definition-scene-memory for Out. In the setting screen for Out, a plurality of output channels (eight channels in the example) are displayed on the display 11. The plurality of output channels each are displayed to have selection images of effects. In the example, selection images of ALL, ATT, GATE, COMP, and EQ are displayed for each of the plurality of output channels. If the image of ALL is selected, all effects will be selected. In the setting screen for Out, input channels are not displayed (unassignable). In the example of FIG. 12, a user selects the effects of ATT, GATE, and COMP with respect to the output channel 1.

Thus, as shown in FIG. 13, as the output channel 1 in the scene 1, memory areas that store parameter setting values of ATT, GATE, and COMP are assigned to the user-definition-scene-memory for Out. However, memory areas that store various kinds of parameter setting values on an input channel side are not assigned to the user-definition-scene-memory for Out.

As mentioned above, by performing such assignment as in the user-definition-scene-memory shown in FIG. 9, a user can manage effects and output destination parameters, which are related to FoH, for each of the plurality of input channels. Further, by performing such assignment as in the user-definition-scene-memory shown in FIG. 11, a user can manage output destination parameters, which are related to Mon, for each of the plurality of input channels. Furthermore, by performing such assignment as in the user-definition-scene-memory shown in FIG. 13, a user can also manage only output-side effects.

Note that, in the above-mentioned examples, it is shown that the parameters to be assigned are selected for every scene, but not limited to this. The parameters, to be assigned, may be determined for every user-definition-scene-memory rather than for every scene. In this case, if a user selects any one of user-definition-scene-memories in the scene list screen shown in FIG. 5A, the CPU 18 will shift to the setting screen shown in FIG. 7.

Secondly, FIG. 14 is a flowchart showing an operation of recalling (recall processing) a user-definition-scene-memory and storing (setting changing processing and storage processing) the user-definition-scene-memory. FIG. 14 is a view showing operation of the CPU 18 (the storage processing portion 183 and the recall processing portion 184) in an operation mode, i.e., in the state where audio mixer 1 performs signal processing. Even in a construction mode, i.e., even in the state where the mixer (audio mixer 1) is stopped to construct various kinds of configurations, however, the operation shown in FIG. 14 may be performed.

If a user instructs to recall a predetermined user-definition-scene-memory (S21:Yes), the CPU 18 (the recall processing portion 184) will read out the recalled user-definition-scene-memory, and read out (call) the assigned specific (several) parameter setting values from the storage portion (S22). Using the specific parameter setting values that have been read out, the CPU 18 overwrites current data to change the corresponding parameter setting values (S23).

This makes it possible to read out only the parameter setting values stored in the area selected by a user, and change the current data. For instance, if a user recalls a user-definition-scene-memory for FoH, only parameter setting values related to the parameter assigned to the user-definition-scene-memory for FoH will be outputted. Therefore, a user can perform a recall only on a FoH side, and perform in-situ adjustment on a monitor side and an output side, for example.

If a user adjusts each of parameter setting values and instructs to store it (S24:Yes), the CPU 18 (storage processing portion 183) will overwrite the current data on the user-definition-scene-memory (S25). In this case, only the parameter setting values assigned to the user-definition-scene-memory are overwritten, but the other parameter setting values (not assigned) are not overwritten. After that, the CPU 18 checks whether or not a user instructs to complete the operation (S26). if a user instructs to complete the operation, the operation will be ended (S26:Yes).

As mentioned above, the audio mixer 1 in accordance with the present exemplary embodiment includes a user-definition-scene-memory independent from the entire scene memory. This enables a user to manage only a necessary portion of scene memory and adjust the parameter setting values, according to its application or object.

In this way, the mixer (audio mixer) 1 in accordance with the present exemplary embodiment calls only setting values of several parameters assigned to a user-definition-scene-memory. Further, the mixer 1 stores only the setting values of several parameters assigned to the user-definition-scene-memory. This enables a user to perform a recall only on an input side, or a recall only on an output side, so that scene memory can be managed according to its application or object.

Note that, it is not necessary for a user-definition-scene-memory to store all of parameter setting values in the flash memory 19. For instance, each of parameter setting values may be stored in the flash memory 19 as the entire scene data, and each of user-definition-scene-memories may be configured to store only information indicating a link destination of a defined area with respect to the entire scene data. When the defined area is recalled or stored, the CPU 18 reads out only parameter setting values of the defined area from the entire scene data, or overwrites only parameter setting values of the defined area with respect to the entire scene data. Thus, the usage amount of memory is not increased, even if a new user-definition-scene-memory is set up.

Note that, the audio mixer 1 may further include a recall safe function that invalidates a recall for only a specific parameter in a user-definition-scene-memory.

The description of the exemplary embodiments is illustrative in all respects, but not restrictive. The scope of the invention is indicated by the appended claims rather than by the above-mentioned embodiments. Furthermore, the scope of the present invention is intended to include all modifications within the meaning and range equivalent to the scope of the claims.

What is claimed is:

1. A mixer comprising:
a storage portion that stores current setting values of a plurality of parameters;
a reception portion that receives specification of several parameters among the plurality of parameters;
a user-definition-scene-memory setting portion that stores the several parameters in the storage portion for every scene as a user-definition-scene-memory, the several parameters being received by the reception portion;
a setting changing portion that receives an operation of changing current setting of the plurality of parameters;
a storage processing portion that stores setting values of the several parameters, among the current setting changed in the setting changing portion, in the storage portion, the several parameters corresponding to the user-definition-scene-memory; and
a recall processing portion that calls the setting values of the several parameters corresponding to the user-definition-scene-memory from the storage portion, when the reception portion receives a recall of the user-definition-scene-memory.

2. The mixer according to claim 1, wherein
the user-definition-scene-memory setting portion receives specification of a plurality of input channels as the several parameters, and
the recall processing portion outputs setting values that are recalled with respect to the plurality of input channels.

3. The mixer according to claim 2, wherein
the user-definition-scene-memory setting portion receives specification of an output destination for each of the plurality of input channels as the several parameters, and
the recall processing portion outputs setting values of the output destination that are called with respect to each of the plurality of input channels.

4. The mixer according to claim 2, wherein
the user-definition-scene-memory setting portion receives specification of an effect processing to which each of the plurality of input channels is subjected as the several parameters; and
the recall processing portion outputs setting value of the effect processing to which each of the plurality of input channels is subjected.

5. The mixer according to claim 1, wherein
the user-definition-scene-memory setting portion receives specification of a plurality of output channels as the several parameters, and
the recall processing portion outputs setting values that are recalled with respect to the plurality of output channels.

6. A control method of a mixer comprising:
receiving specification of several parameters among a plurality of parameters;
storing the received several parameters in a storage portion for every scene as a user-definition-scene-memory;
receiving an operation of changing current setting of the plurality of parameters;
storing setting values of the several parameters in the storage portion, the setting values being changed in the received operation; and
calling the setting value of the several parameters corresponding to the user-definition-scene-memory from the storage portion, when a recall of the user-definition-scene-memory is received.

7. The control method of the mixer according to claim 6, further comprising:
receiving specification of a plurality of input channels as the several parameters; and
outputting setting values that are recalled with respect to the plurality of input channels.

8. The control method of the mixer according to claim 7, further comprising:
receiving specification of an output destination for each of the plurality of input channels as the several parameters; and
outputting setting values of the output destination that are recalled with respect to each of the plurality of input channels.

9. The control method of the mixer according to claim 7, further comprising:
receiving specification of effect processing to which each of the plurality of input channels is subjected as the several parameters; and
outputting setting values of the effect processing to which each of the plurality of input channels is subjected.

10. The control method of the mixer according to claim 6, further comprising:
receiving specification of a plurality of output channels as the several parameters; and
outputting setting values that are recalled with respect to the plurality of output channels.

11. A non-transitory readable storage medium that stores a program for causing a computer to perform:
reception processing that receives specification of several parameters among a plurality of parameters whose setting values are stored in a storage portion;
user-definition-scene-memory setting processing that receives specification of the several parameters in the reception processing, and stores the received several parameters in the storage portion for every scene as a user-definition-scene-memory;
setting changing processing that receives an operation of changing current setting of the plurality of parameters;
storage processing that stores setting values of the several parameters in the storage portion, the setting values being changed in the setting changing processing; and
recall processing that calls setting values of the several parameters corresponding to the user-definition-scene-memory from the storage portion, when a recall of the user-definition-scene-memory is received in the reception processing.

* * * * *